United States Patent
Fu et al.

(10) Patent No.: US 8,433,758 B2
(45) Date of Patent: Apr. 30, 2013

(54) METHOD AND SYSTEM FOR USER INFORMATION PROCESSING AND RESOURCE RECOMMENDATION IN A NETWORK ENVIRONMENT

(75) Inventors: Rong Yao Fu, Beijing (CN); Wei Gao, Beijing (CN); Tao Wang, Beijing (CN); Quan Yuan, Beijing (CN); Xia Tian Zhang, Beijing (CN); Shiwan Zhao, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 602 days.

(21) Appl. No.: 12/711,439

(22) Filed: Feb. 24, 2010

(65) Prior Publication Data

US 2010/0223336 A1 Sep. 2, 2010

(30) Foreign Application Priority Data

Feb. 27, 2009 (CN) .......................... 2009 1 0118068

(51) Int. Cl.
*G06F 15/16* (2006.01)
(52) U.S. Cl.
USPC ........................... 709/205; 709/226; 709/229
(58) Field of Classification Search .................. 709/205, 709/226, 229
See application file for complete search history.

(56) References Cited

U.S. PATENT DOCUMENTS

| 8,024,324 B2 * | 9/2011 | Amitay et al. ................. 707/715 |
| 2010/0114890 A1 * | 5/2010 | Hagar et al. ................... 707/737 |
| 2010/0122070 A1 * | 5/2010 | Guevorkian et al. .......... 712/222 |

OTHER PUBLICATIONS

Berlin, A.; Weise, D.; Compiling scientific code using partial evaluation, Computer, vol. 23, Issue 12, Dec. 1990 pp. 25-37.
Stoll, H.M.; Lee, L-S.,A continuous-time optical neural network, IEEE International Conference on Neural Networks, 1988, Volume, Issue , Jul. 24-27, 1988 pp. 373-384 vol. 2.

* cited by examiner

*Primary Examiner* — Douglas Blair
(74) *Attorney, Agent, or Firm* — Vazken Alexanian

(57) ABSTRACT

A method and apparatus for user information processing in a network environment. The method performs an orthogonal transform on first and second vectors representing information related to first and second users respectively to obtain first and second transformed vectors. Then, the method splits the first and second transformed vectors into two parts respectively, such that first and second vectors cannot be derived from the first or second parts. The first and second user devices exchange the first part of the first transformed vector and the second part of the second transformed vector. The first and second user devices calculate the inner product of the first parts and the second parts respectively. Finally, the two inner products of the parts are summed to get an inner product of the first and second vectors. Also provided are a method and system for resource recommendation in a network environment.

11 Claims, 13 Drawing Sheets

METHOD AND SYSTEM FOR USER INFORMATION PROCESSING AND RESOURCE RECOMMENDATION IN A NETWORK ENVIRONMENT

CROSS-REFERENCE TO RELATED APPLICATIONS

This application claims priority under 35 U.S.C. §119 from Chinese Patent Application No. 200910118068.9, filed Feb. 27, 2009, the entire contents of which are incorporated herein by reference.

TECHNICAL FIELD OF THE INVENTION

The present invention relates to user information processing in a network environment and particularly to user privacy protection in a network environment. More particularly, the present invention relates to a method and apparatus for user information processing in a network environment, and a method and system for recommending network resources to users.

BACKGROUND OF THE INVENTION

Vector inner products can represent the similarity and correlation between vectors and therefore are widely used in fields such as Machine Learning, Information Retrieval, Recommender System, etc. For example, a recommender system in a network environment attempts to measure the similarity between users' preference vectors by computing the inner product to find neighbors of users and aggregate users into groups. Cosine correlation and Pearson correlation are common measures of similarity. Although their formulas are different, the essential parts are both vector inner products. Support Vector Machine uses only vector inner products to construct a decision super plane. The formula for computing a vector inner product is very simple. If vectors are $A=(a_1, a_2, \ldots, a_n)$ and $B=(b_1, b_2, \ldots, b_n)$, then their inner product is:

$$\langle A, B \rangle = \sum_{i=0}^{n} a_i, b_i, i = 1 \ldots n$$

Another scenario related to user private information protection in a network environment is the recommending process of a recommender system. In the recommending process, the recommender system uses the resource preference vectors of a user's neighbors to form a recommendation list for the user. The resource preference vectors including private information such as browsing history, downloading logs, transactions, and personal profiles, etc. In the recommending process of a conventional recommender system the private information of a user's neighbors will be exposed to the user or a central server.

Therefore, there is a need in the field for a solution for computing the inner product of user preference vectors and for protecting user privacy in scenarios such as the recommending process of a recommender system.

SUMMARY OF THE INVENTION

In one aspect of the present invention, there is provided a method for user information processing in a network environment. An orthogonal transform is performed on a first vector representing information related to a first user at a first user device, thus obtaining a first transformed vector. The first transformed vector is split into a plurality of parts at the first user device, wherein the first vector or part thereof cannot be derived from any part of the first transformed vector and wherein each part has a part order number. A part of the first transformed vector is sent from the first user device to a second user device, retaining another part of the first transformed vector and, if the first transformed vector was split into more than two parts, the first user device sends any additional parts to one or more additional user devices, wherein all the devices are connected with the first user device via a network, and wherein the parts are sent such that each part is sent to a different user device. The first user device receives a part of a second transformed vector from the second user device, wherein (i) the part of the second transformed vector was obtained by performing the orthogonal transform on a second vector representing the information related to the second user to obtain a second transformed vector, (ii) the second transformed vector was split correspondingly into an equal number of parts at the second user device as in the first user device, (iii) the second vector or part thereof cannot be derived from any part of the second transformed vector, and (iv) the part of the second transformed vector received by the first user device has a same part order number as the part retained by the first user device; The first user device calculates an inner product of the part of the first transformed vector retained by the first user device and the part of the second transformed vector received by the first user device to obtain a first inner product. The first user device receives a second inner product from the second user device, wherein the second inner product was obtained by calculating an inner product of the part of the first transformed vector sent to the second user device and the part of the second transformed vector at the second user device having the same part order number. The first user device receives any additional inner products from any additional user devices that were sent a part of the first transformed vector from the first user device, wherein the inner product was calculated at the additional user device by calculating an inner product of the part of the first transformed vector sent to the additional user device and the part of the second transformed vector sent by the second user device to the additional user device having the same part order number. The first user device sums the first inner product, the second inner product, and any additional inner products as an inner product of the first vector and second vector at the first user device.

In another aspect of the present invention, there is provided an apparatus for user information processing in a network environment. The apparatus includes transforming module, a splitting module, a sending and receiving module, a calculating module and a summing module. The transforming module is configured to perform an orthogonal transform on a first vector representing information related to a first user at a first user device, thus obtaining a first transformed vector. The splitting module is configured to split the first transformed vector into a plurality of parts at the first user device, wherein the first vector or part thereof cannot be derived from any part of the first transformed vector and wherein each part has a part order number. The sending and receiving module is configured to send the parts of the first transformed vector from the first user device to other user devices, receive a part of a second transformed vector from a second user device and receive a second inner product from the second user device and any additional inner products from any additional user devices. The calculating module is configured to calculate an inner product of a part of the first transformed vector retained by the first user device and a part of the second transformed vector received by the first user device to obtain a first inner product at the first user device. The summing module configured to sum the first inner product, the second inner product, and any additional inner products as an inner product of the first vector and second vector at the first user device.

In yet another aspect of the present invention there is provided a method for recommending resources to a user in a network environment. At a device of each neighbor an automorphic transform is performed on a resource preference vector of the neighbor to generate a transformed vector of the neighbor. At the device of each neighbor, the transformed vector is split into at least two parts, wherein the resource preference vector or part thereof cannot be derived from any of the parts. Each of the at least two parts are sent from the device of each neighbor to the device of the user, the device of another neighbor, or one or more other devices, or keeping a part at a device of a neighbor, so that the respective parts of the transformed vectors of all the neighbors exist in the respective same device in the device of the user, the devices of the at least two neighbors and the one or more other devices, wherein all the parts of any other transformed vectors do not exist in any of the device of the user, the devices of the two or more neighbors and the one or more other devices, except the transformed vector of each neighbor existing at the device of the neighbor. At the device of the user, the device of each neighbor and each of the one or more other devices, the respective parts of all the transformed vectors are summed, respectively. The calculated sum of the respective parts of all the transformed vectors are sent from the device of each neighbor and each of the one or more other devices to the device of the user respectively. At the device of the user, all the sums of the respective parts of all the transformed vectors are summed into a sum of all the transformed vectors. At the device of the user, the reverse transform is performed on the sum of all the transformed vectors, so as to generate a resource preference vector to be recommended to the user.

In a further aspect of the present invention, there is provided a system for recommending network resources to a user in a network environment. A transforming module residing at the device of each neighbor is configured to perform an automorphic transform on a resource preference vector of the neighbor to generate a transformed vector of the neighbor. A splitting module residing at the device of each neighbor is configured to split the transformed vector into at least two parts, wherein the resource preference vector or part thereof cannot be derived from any of the parts. A sending module residing at the device of each neighbor is configured to send each of the at least two parts from the device of each neighbor to the device of the user, the device of another neighbor, or one or more other devices, or keeping a part at a device of a neighbor, so that the respective parts of the transformed vectors of all the neighbors exist in the respective same device in the device of the user, the devices of the at least two neighbors and the one or more other devices, wherein all the parts of any other transformed vectors do not exist in any of the device of the user, the devices of the two or more neighbors and the one or more other devices, except the transformed vector of each neighbor existing at the device of the neighbor. A calculating module residing at the device of the user, the device of each neighbor and each of the one or more other devices is configured to calculate the sum of the respective parts of all the transformed vectors respectively. A sending module residing at the device of each neighbor and each of the one or more other devices is configured to send the calculated sum of the respective parts of all the transformed vectors to the device of the user respectively. An integrating module residing at the device of the user is configured to integrate all the sums of the respective parts of all the transformed vectors into a sum of all the transformed vectors. Lastly, a reverse transforming module residing at the device of the user is configured to perform the reverse transform on the sum of all the transformed vectors, so as to generate a resource preference vector to be recommended to the user.

The advantages of the present invention are that it can both compute the inner product of the vectors representing information related to users or recommend resources to a user according to the computation of the resource preference vectors of the neighbors of the user, and protect the privacy of the user and his neighbors.

DESCRIPTION OF THE PREFERRED EMBODIMENTS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings.

The idea of the present invention is that, at a relevant user's computing device, a specific transform is used to transform the initial vector representing the information related to the user into a new vector and split the new vector into different parts. The transformation and/or the splitting have such a nature that the initial vector cannot be computed based on any of the parts. Then, the various parts are distributed to different users' computing devices to perform operations as required by the application scenario. Finally, the results of the operations are collected into one computing device to be combined and, when necessary, a reverse transform is performed to obtain the final result. The final result is the same as the result of using the user's initial vector to perform the operations as required by the application scenario. In this way, the result of the operations performed on the user's vector as required by the application scenario is obtained and, at the same time, no user's vector can be obtained at any other user's computing device, thus protecting the user privacy.

Embodiments of the present invention will now be described with reference to the drawings. In the following description, numerous details are set forth in order for the present invention to be more fully understood. However, for those skilled in the art, it is obvious that the present invention can be implemented without some of the details. The words "a first", "a second" and "a third" etc. appearing in the following description are only used for the convenience of narration, rather than denoting any order. In addition, it is to be understood that the present invention is not limited to the described embodiments. On the contrary, it is contemplated that the present invention can be implemented using any combination of the following features and elements, regardless of whether they relate to different embodiments. Therefore, the following aspects, features, embodiments and advantages are only for illustration, and should not be regarded as elements or limitations of the attached claims, unless explicitly recited therein otherwise.

Figure 1:
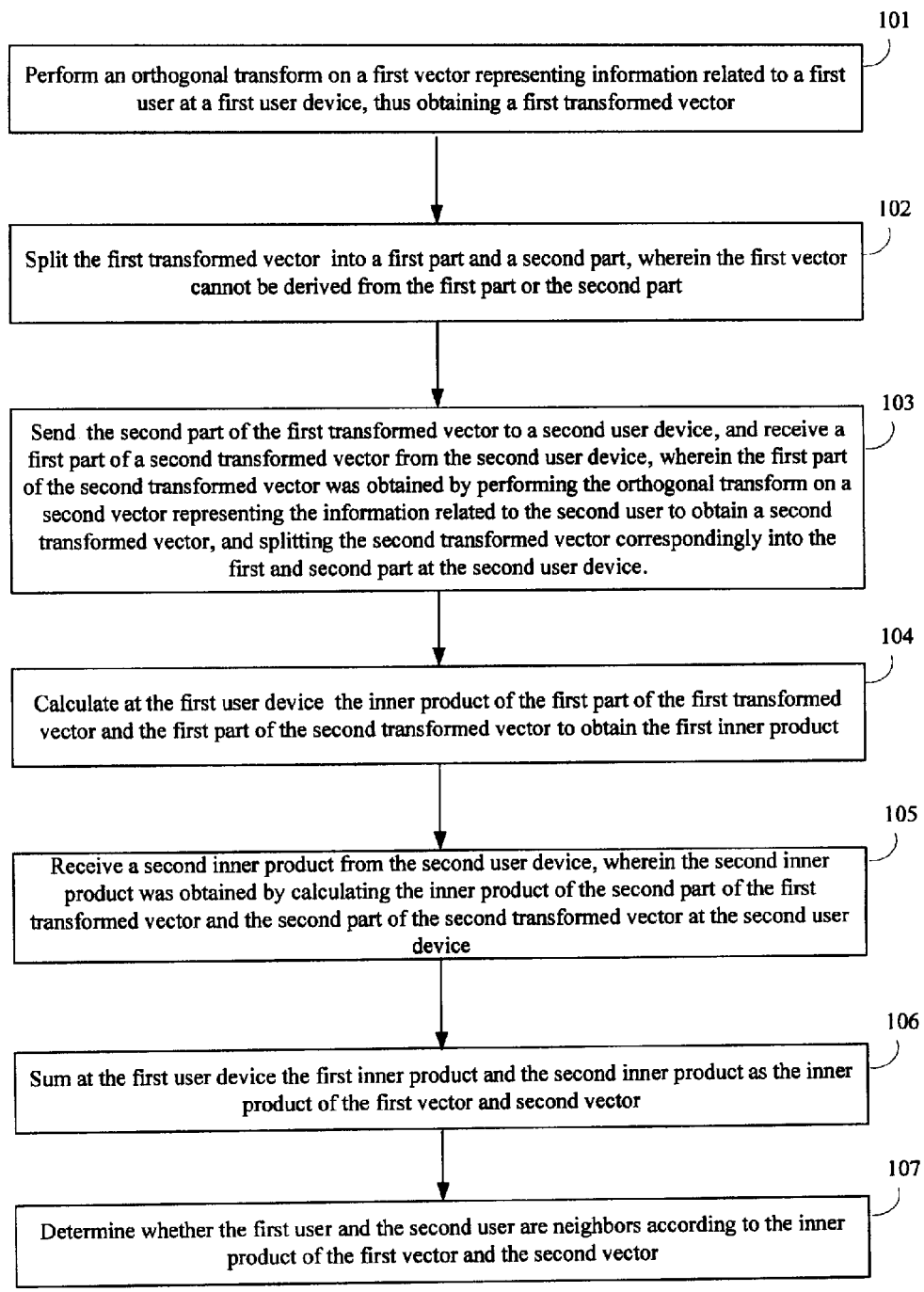
FIG. 1 illustrates a method for user information processing in a network environment in accordance with an embodiment of the present invention.

In a first aspect of the present invention, there is provided a method for user information processing in a network environment. FIG. 1 illustrates a method for user information processing in a network environment in accordance with an embodiment of the present invention.

In step 101, an orthogonal transform is performed on a first vector representing information related to a first user at a first user device, thus obtaining a first transformed vector. The first vector may represent information related to the user such as the user's download list, browsing history, etc. The orthogonal transform can transform vectors from one inner product space to another inner product space, while the inner product value of the vectors remains the same. Preferably, an orthogonal transform with good decompaction should be used. Decompaction can guarantee that no part of the transformed vector can be used to reconstruct the original vector or even part of the original vector or a similar vector.

In an embodiment of the present invention, a discrete-cosine transform is used as the orthogonal transform. Further, preferably, a dual discrete cosine transform can be used. That is, after the original vector is transformed using the discrete-cosine transform, the transformed vector is further transformed using the discrete-cosine transform, thus the decompaction may be further improved.

In another embodiment of the present invention, the orthogonal transform is implemented by a random orthogonal matrix. In other words, a different orthogonal matrix is used for each orthogonal transform calculation. In particular, in order that each orthogonal transform calculation uses a different orthogonal transform, an orthogonal matrix may be generated through negotiation before each calculation.

Taking the calculation of two nodes as an example, the steps for generating the orthogonal matrixes may be as follows:

In the first step, node A and node B each generates a pseudo-random number respectively, and after exchanging, sums them or performs other calculations to get a new number, as the seed of a pseudo-random number generator;

In the second step, node A and node B use the same pseudo-random number generator and the negotiated seed to generate a same matrix M;

In the third step, node A and node B examine whether the matrix M is full rank, and if it is not, repeat step 1 and 2, and if it is, proceed to the following operation; and In the fourth step, mode A and node B use the Schmidt Orthogonalization method to obtain the standard orthogonal basis of the matrix M respectively.

The obtained standard orthogonal basis is an orthogonal matrix N, which can be used to implement the orthogonal transform.

Returning to FIG. 1, in step 102, at the first user device, the first transformed vector is split into a first part and a second part of the first transformed vector. The first vector cannot be derived from the first part or the second part of the first transformed vector. The first transformed vector can be split into the first part and the second part in different ways. For example, the first part and second part can include the same or different numbers of elements. Further, in order to ensure that the first vector cannot be derived from any part of the first transformed vector, in addition to using an orthogonal transform with good decompaction as described above, in the splitting, the elements at even number positions and those at the odd number positions of the first transformed vector can be split into the first part and the second part respectively.

In step 103, the second part of the first transformed vector is sent from the first user device to a second user device connected with the first user device via a network. Also, a first part of a second transformed vector is received from the second user device. The first part of the second transformed vector was obtained by performing the orthogonal transform on a second vector representing the information related to the second user to obtain a second transformed vector, and splitting the second transformed vector correspondingly into the first part and the second part of the second transformed vector at the second user device. The second vector has the same number of elements as the first vector, and each element of the second vector has the same meaning as the corresponding element of the first vector, for example, representing the same resource item.

In step 104, at the first user device, the inner product of the first part of the first transformed vector and the first part of the second transformed vector is calculated to obtain the first inner product.

In step 105, a second inner product is received from the second user device. The second inner product was obtained by calculating the inner product of the second part of the first transformed vector and the second part of the second transformed vector at the second user device.

In step 106, at the first user device, the first inner product and the second inner product are summed as the inner product of the first vector and second vector. The inner product of the first vector and the second vector reflects the similarity between the first vector and the second vector.

In accordance with an embodiment of the present invention, the method of the present invention may further include an additional step 107 for determining whether the first user and the second user are neighbors according to the inner product of the first vector and the second vector.

The method the present invention can be used to determine whether two users are neighbors by calculating the inner product of the preference vectors of the two users in a recommendation system. Or, the method can be used to calculate the similarity or correlation between different users' information in application scenarios such as Machine Learning, Data Mining and Information Retrieval in a p22 environment. Or, the method can be used to determine the similarity and correlation between email contents of different users by calculating the inner product of the vectors related to the email contents of different users, thereby constructing a social network. In all the above application scenarios, the method of the present invention can ensure the private information of users is not exposed.

Figure 2:
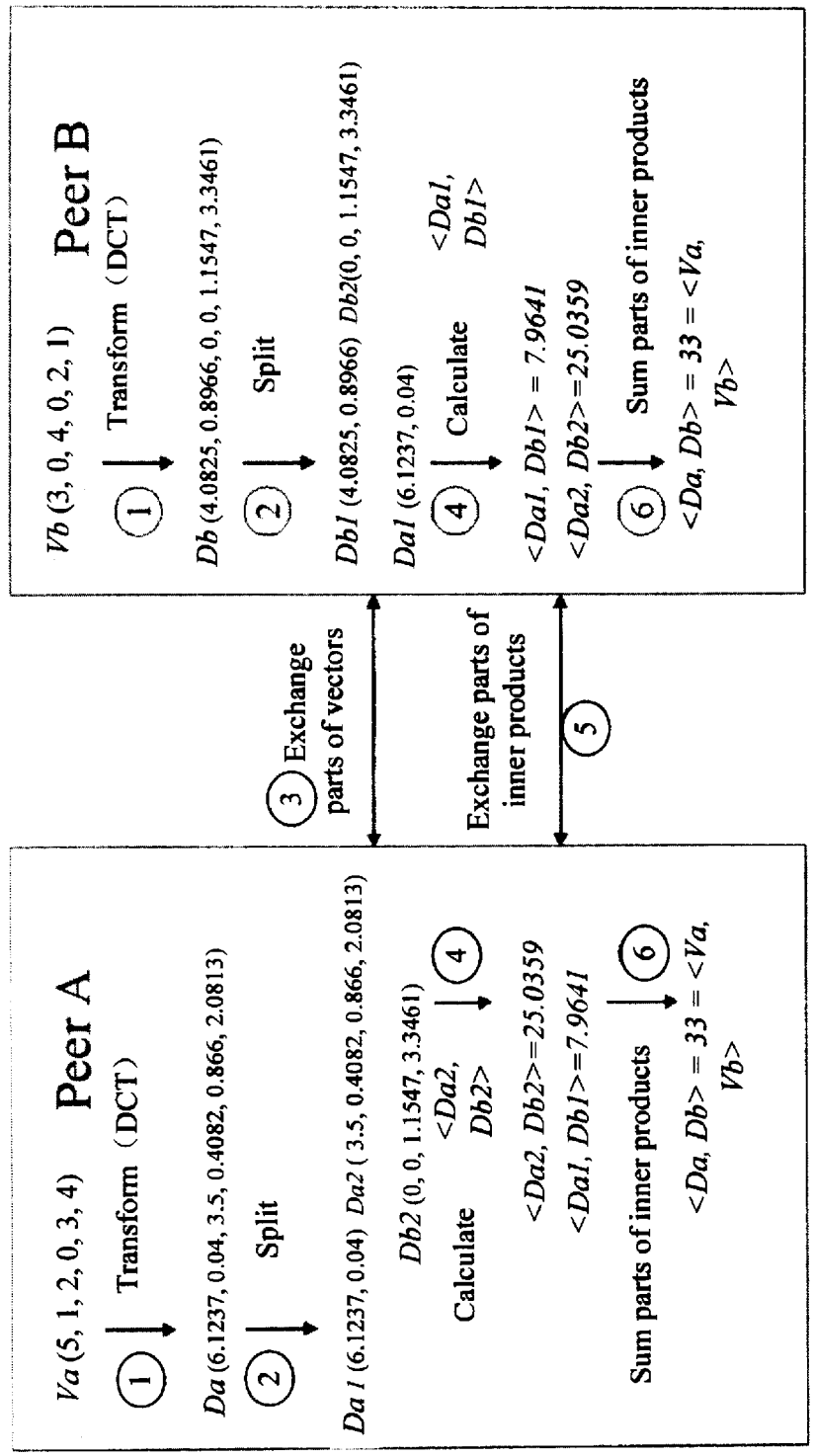
FIG. 2 schematically exemplifies the process of the method for user information processing in a network environment in accordance with an embodiment of the present invention.

FIG. 2 schematically exemplifies the process for user information processing in a network environment in accordance with an embodiment of the present invention. As shown, in the first step, two computing devices Peer A and Peer B in a network use the Discrete Cosine Transform to transform the original vectors Va(5, 1, 2, 0, 3, 4) and Vb(3, 0, 4, 0, 2, 1) into new vectors Da(6.1237, 0.04, 3.5, 0.4082, 0.866, 2.0813) and Db(4.0825, 0.8966, 0, 0, 1.1547, 3.3461) respectively.

In the second step, Peer A splits the Da into two parts Da1(6.1237, 0.04) and Da2(3.5, 0.4082, 0.866, 2.0813). And Peer B splits Db into two parts Db1(4.0825, 0.8966) and Db2(0, 0, 1.1547, 3.3461) in the same way.

In the third step, Peer A sends Da1 to Peer B; and Peer B sends Db2 to Peer A.

In the fourth step, Peer A calculates the inner product of Da2 and Db2, <Da2, Db2>=25.0359; and Peer B calculates the inner product of Da1 and Db1, <Da1, Db1>=7.9641.

In the fifth step, Peer A and Peer B exchanges the two inner products <Da2, Db2> and <Da1, Db1>.

In the sixth step, Peer A and Peer B sum the two inner products respectively to obtain the inner product of the vector Da and Db, <Da, Db>=33, which is the same value as the inner product <Va, Vb> of the original Va and Vb.

Figure 3:
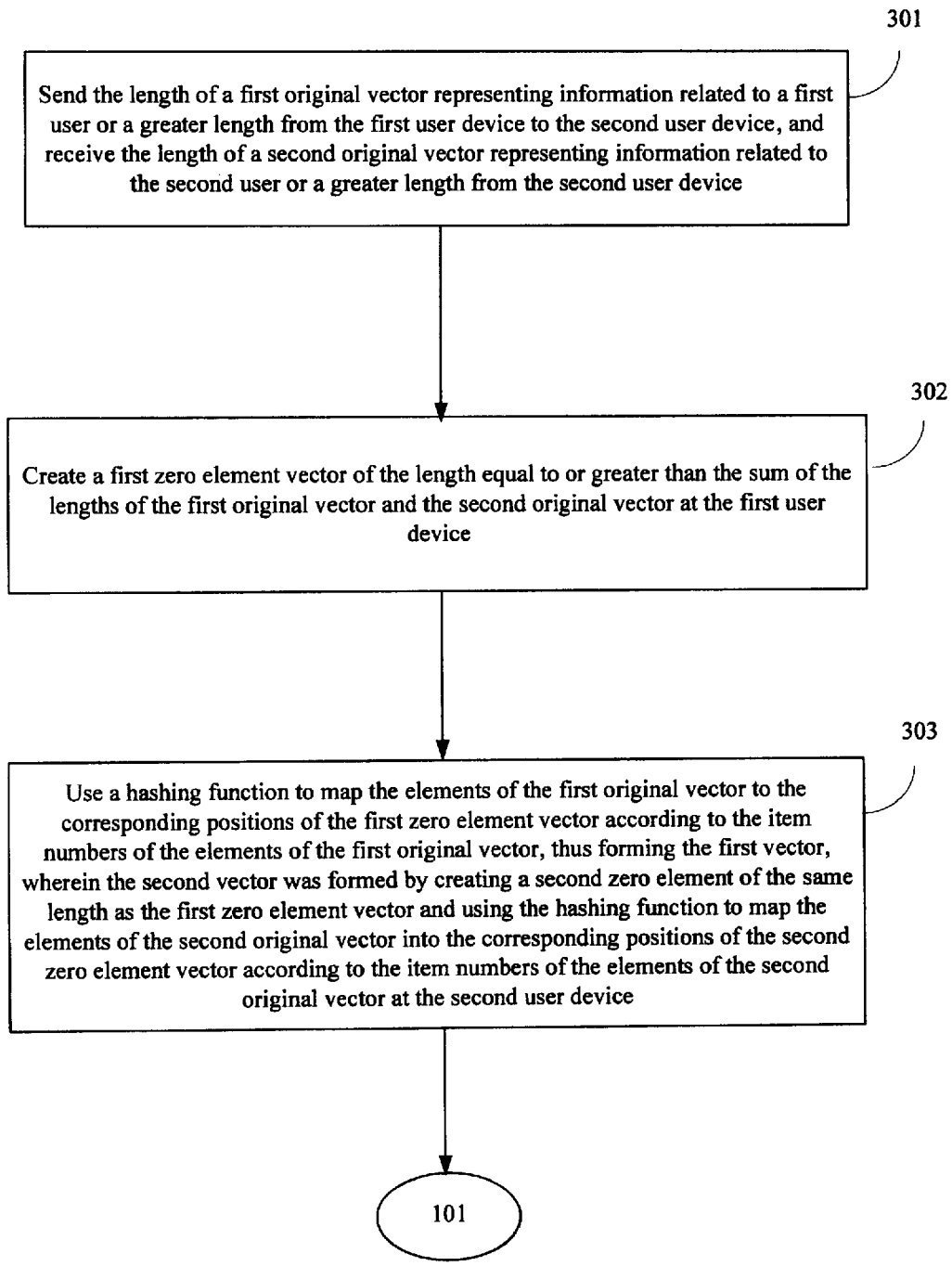
FIG. 3 illustrates the additional steps for compressing the lengths of inner products before computing the inner product of the vectors in a method in accordance with a further embodiment of the present invention.

While the above method includes all the necessary technical features of the technical solution of the present invention, in a practical system, the method may have some performance problems. For example, assuming the vectors include download lists of users, since each user's download list is typically small, and the number of possible download items are very large, such as millions or even tens millions, and since this method requires each user's vector has the same size, using the vectors of the same size to represent the download lists of users will generate very large and sparse vectors, thus bring a huge computing load to the system. Therefore, in a further embodiment of the present invention, the method may further include an additional step of compressing the lengths of vectors before computing the inner product of vectors. FIG. 3 illustrates the additional step of the method in accordance with the further embodiment of the present invention.

As shown, in step 301, the length of a first original vector representing information related to a first user or a greater length is sent from the first user device to the second user device, and the length of a second original vector representing information related to the second user or a greater length is received from the second user device.

In step 302, a first zero element vector of the length equal to or greater than the sum of the lengths of the first original vector and the second original vector is created at the first user device.

In step 303, at the first user device, a hashing function is used to map the elements of the first original vector to the corresponding positions of the first zero element vector according to the item numbers of the elements of the first original vector, thus forming the first vector. The second vector is formed by creating a second zero element of the same length as the first zero element vector and using the hashing function to map the elements of the second original vector to the corresponding positions of the second zero element vector according to the item numbers of the elements of the second original vector at the second user device. Any hashing function that can map an item number to an element position of the zero element vector is applicable. In other words, any hashing function, provided the number of hashed values obtained by hashing different numbers is equal to or less than the size of the zero element vector, is applicable.

Figure 4:
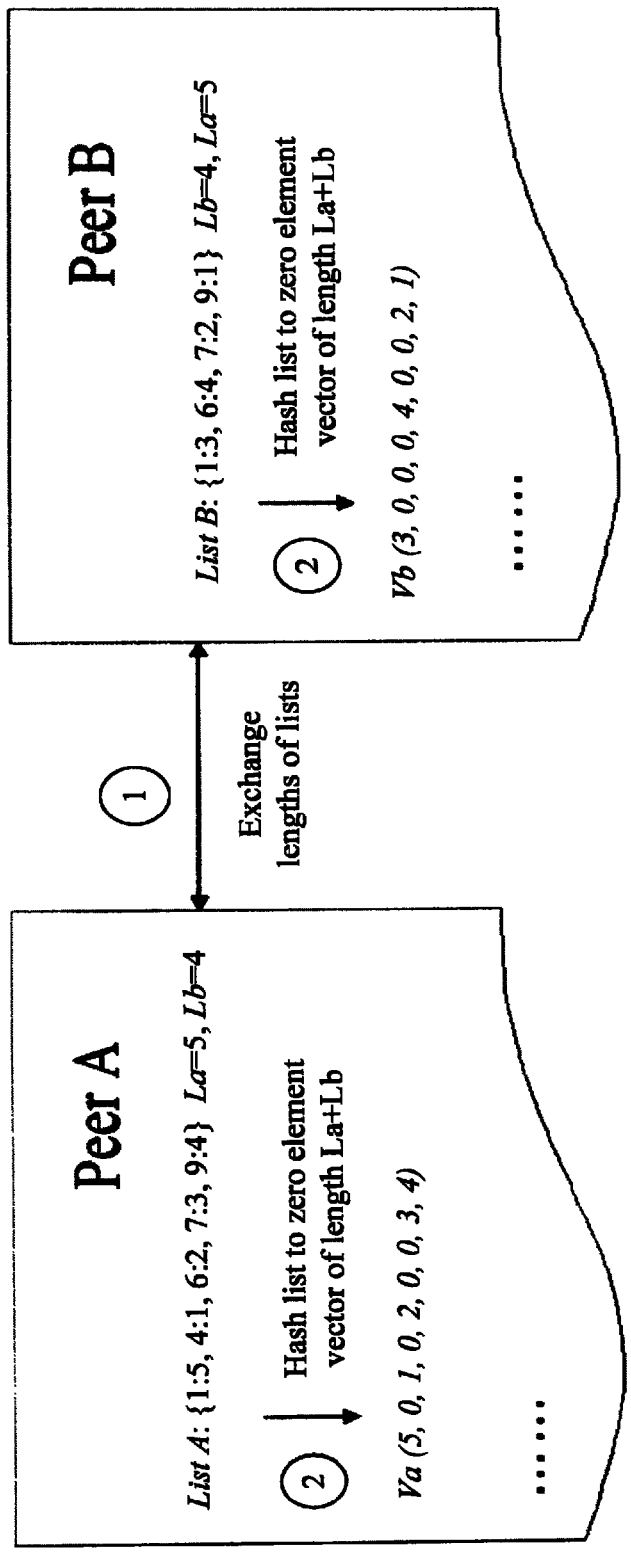
FIG. 4 schematically exemplifies the process for compressing the lengths of inner products before computing the inner product of the vectors in a method in accordance with a further embodiment of the present invention.

FIG. 4 schematically exemplifies the process of compressing the lengths of vectors before computing the inner product in accordance with the further embodiment of the present invention. As shown, the list at Peer A is ListA: {1:5, 4:1, 6:2, 7:3, 9:4}, representing the values of the five items with the numbers of 1, 4, 6, 7 and 9 respectively are 5, 1, 2, 3, 4 respectively; the list at Peer B is ListB: {1:3, 6:4, 7:2, 9:1}, representing the values of the four items with the numbers of 1, 6, 7 and 9 respectively are 3, 4, 2 and 1 respectively. In the first step, Peer A and Peer B exchange the lengths of their respective list La=5 and Lb=4. In fact, Peer A and Peer B do not necessarily need tell the true lengths of their lists to each other, rather, any number greater than the true length of their lists is feasible. In the second step, Peer A and Peer B create a zero element vector of the same length respectively, the length of each zero element vector being equal to or greater than the sum of the lengths of the their lists, namely, Va(0, 0, 0, 0, 0, 0, 0, 0, 0) and Vb(0, 0, 0, 0, 0, 0, 0, 0, 0). Then, Peer A and Peer B use the same hashing function to map the items in their lists to the corresponding positions in their respective zero element vectors according to the numbers of the items of their respective lists List A and List B respectively, thus forming vectors Va(5, 0, 1, 0, 2, 0, 0, 3, 4) and Vb(3, 0, 0, 0, 4, 0, 0, 2, 1). That is, the hashing function maps the item number 1 into the element position 0, the item number 4 into the element position 2, the item number 6 into the element position 4, the item number 7 into the element position 7, and the item number 9 into the element position 8.

Figure 5:
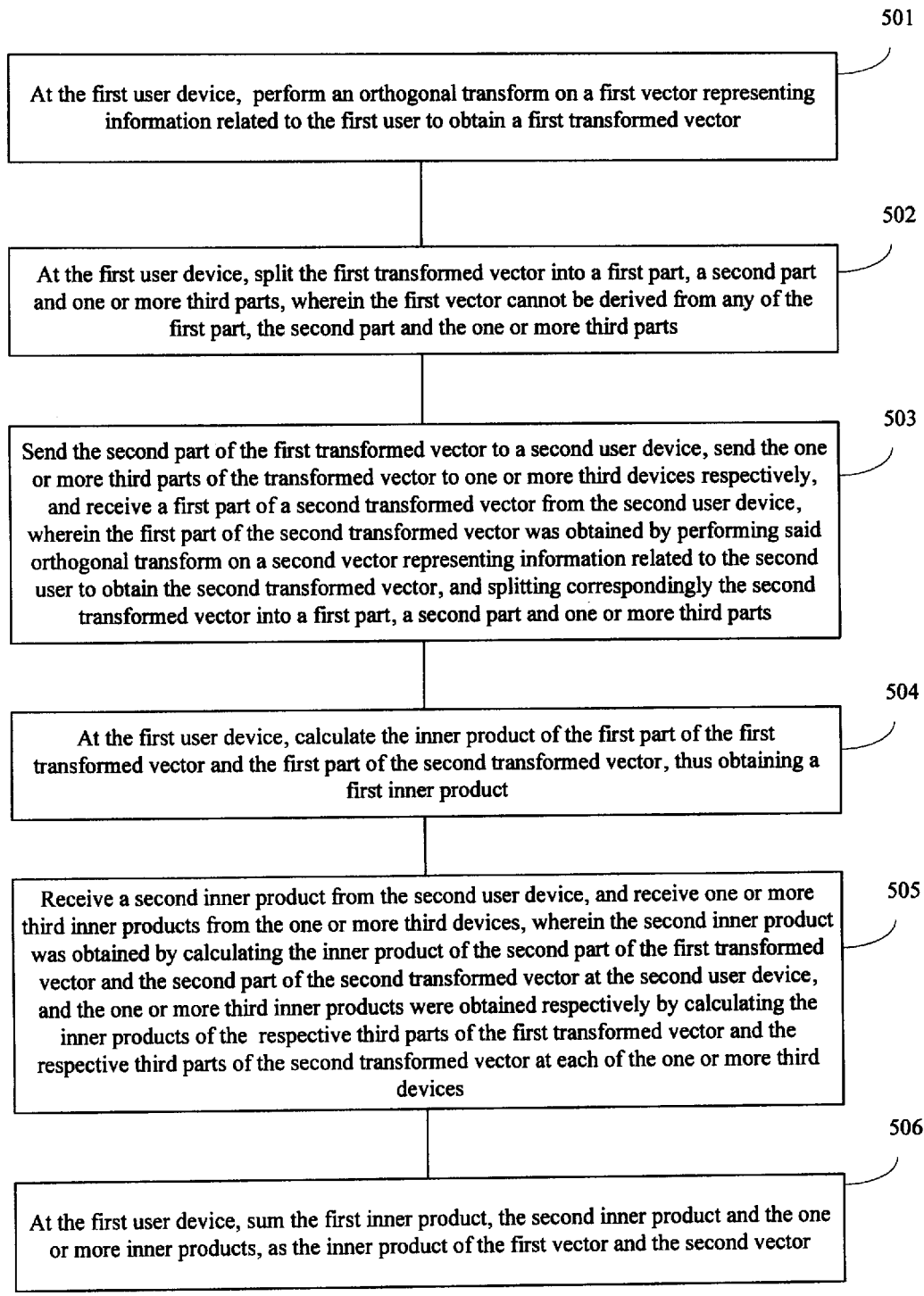
FIG. 5 illustrates a method for user information processing in a network environment in accordance with a further embodiment of the present invention.

Further, how to split the transformed vector and where to distribute parts of the transformed vector will not change the essence of the present invention. For example, each transformed vector can also be split into three parts, which can be respectively sent to three other devices to compute the inner product of each part. FIG. 5 illustrates a method for user information processing in a network environment in accordance with a further embodiment of the present invention. As shown, the method includes the following steps.

In step 501, as in the above step 101, at the first user device, an orthogonal transform is performed on a first vector representing information related to the first user to obtain a first transformed vector.

In step 502, at the first user device, the first transformed vector is split into a first part, a second part and one or more third parts of the first transformed vector, wherein the first vector cannot be derived from any of the first part, the second part and the one or more third parts.

In step 503, from the first user device, the second part of the first transformed vector is sent to a second user device connected with the first user device via a network. The one or more third parts of the transformed vector are sent to one or more third devices connected with the first user device and the second user device via a network respectively. A first part of a second transformed vector is received from the second user device, wherein the first part of the second transformed vector was obtained by performing said orthogonal transform on a second vector representing information related to the second user to obtain the second transformed vector, and splitting correspondingly the second transformed vector into a first part, a second part and one or more third parts of the second transformed vector.

In step 504, as in step 104, at the first user device, the inner product of the first part of the first transformed vector and the first part of the second transformed vector, thus obtaining a first inner product.

In step 505, a second inner product is received from the second user device, and one or more third inner products are received from the one or more third devices. The second inner product was obtained by calculating the inner product of the second part of the first transformed vector and the second part of the second transformed vector at the second user device. The one or more third inner products were obtained respectively by calculating the inner products of the respective third parts of the first transformed vector and the respective third parts of the second transformed vector at each of the one or more third devices.

In step 504, at the first user device, the first inner product, the second inner product and the one or more inner products are summed, as the inner product of the first vector and the second vector.

While a method for user information processing in a network environment in accordance with an embodiment of the present invention has been described above, it should be noted that the above description is only illustrative, rather than limitation to the present invention. In other embodiments of the present invention, the method can have more, less or different steps, and the order between steps may be different from that described, or they may be executed in parallel.

Figure 6:
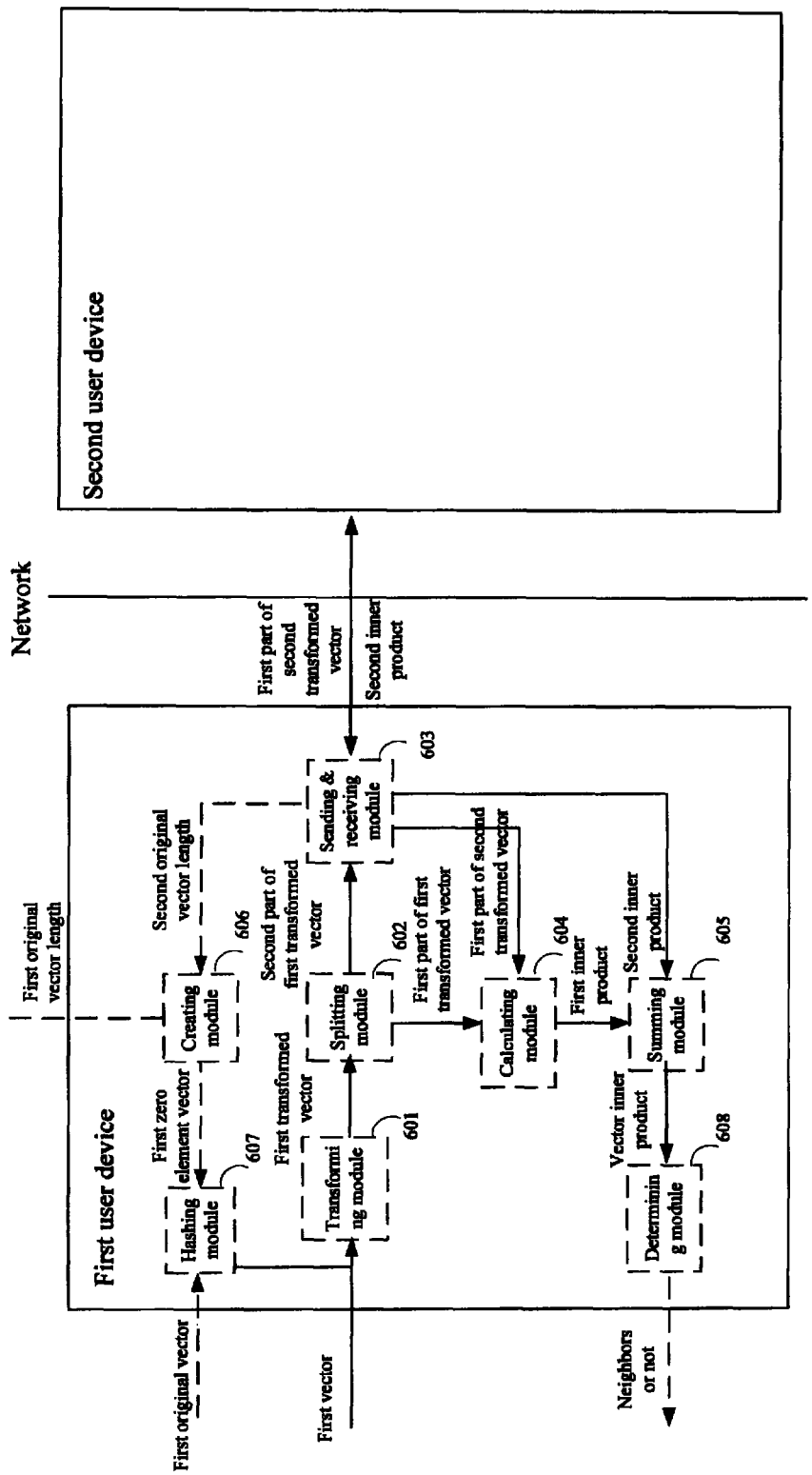
FIG. 6 illustrates an apparatus for user information processing in a network environment in accordance with an embodiment of the present invention.

Referring now to FIG. 6, there is illustrated an apparatus for user information processing in a network environment in accordance with an embodiment of the present invention. The apparatus can be used to execute the method described above. For the sake of brevity, some details redundant with the above description are omitted from the following description. Thus, more detailed understanding of the apparatus of the present invention can be obtained by referring to the above description.

Referring to FIG. 6, a transformation module 601 performs an orthogonal transform on a first vector representing information related with a first user at a first user device to obtain a first transformed vector.

A splitting module 602 splits the first transformed vector into a first part and a second part of the first transformed vector, wherein the first vector cannot be derived from the first part or the second part of the first transformed vector.

A sending and receiving module 603 sends the second part of the first transformed vector of the first transformed vector from the first user device to a second user device connected with the first user device via a network, and receives from the second user device a first part of a second transformed vector, wherein the first part of the second transformed vector was obtained by performing said orthogonal transform on a second vector representing information related with a second user at a second user device to obtain a second transformed vector and splitting the second transformed vector into a first part and a second part of the transformed vector correspondingly at the second user device.

A calculating module 604 calculates the inner product of the first part of the first transformed vector and the first part of the second transformed vector at the first user device to obtain the first inner product.

The sending and receiving module 603 also receives a second inner product from the second user device, wherein the second inner product was obtained by calculating the inner product of the second part of the first transformed vector and the second part of the second transformed vector at the second user device.

A summing module 605 summons the first inner product and the second inner product at the first user device, as the inner product of the first vector and the second vector.

In order to improve the performance of the apparatus of the present invention in case of large and sparse vectors, in accordance with a further embodiment of the present invention, the apparatus of the present invention may further includes optional modules or features.

Optionally, the sending module 603 may further send the length of the first original vector representing information related to a first user or a greater length from the first user device to the second user device, and receives the length of the second original vector representing information related to the second user from the second user device.

Optionally, the apparatus may include a creating module 606 for creating a zero element vector of the length equal or greater than the sum of the lengths of the first original vector and the second original vector at the first user device.

Optionally, the apparatus may include a hashing module 607 for using a hashing function at the first user device to map the elements of the first original vector to the corresponding positions of the first zero element vector according to the item numbers of the elements of the first original vector to form the first vector, wherein the second vector is formed by creating a second zero element of the same length as the first zero element vector and using the hashing function to map the elements of the second original vector into the corresponding positions of the second zero element vector according to the item numbers of the elements of the second original vector at the second user device.

According to an embodiment of the present invention, the orthogonal transform is a discrete cosine transform, and further preferably, the orthogonal transform is a dual discrete cosine transform.

For the sake of brevity, FIG. 6 only illustrates in detail the structure of the first user device. It can be appreciated, however, that the second user device has the same structure. In addition, although in the illustration of FIG. 6 and in the above description only have two user devices, additional devices may be included that will not affect the essence of the invention. For example, each transformed vector may be split into three parts, which may be sent to three other devices to calculate the inner product of each part.

Thus, in accordance with another embodiment of the present invention, the splitting module 602 can split the first transformed vector into a first part, a second part and one or more third parts of the first transformed vector at the first user device, wherein the first vector cannot be derived from any of the first part, the second part and the one or more third parts.

The sending and receiving module 603 can send the second part of the first transformed vector to the second user device, send the one or more third parts of the transformed vector respectively to one or more third devices connected with the first user device and the second user device via a network at the first user device, and receive a first part of a second transformed vector from the second user device. The first part of the second transformed vector should be obtained by performing said orthogonal transform on a second vector representing information related to the second user to obtain the second transformed vector, and splitting correspondingly the second transformed vector into a first part, a second part and one or more third parts of the second transformed vector.

The sending and receiving module 603 is further for receiving a second inner product from the second user device, and receiving one or more third inner products from the one or more third device, wherein the second inner product was obtained by calculating the inner product of the second part of the first transformed vector and the second part of the second transformed vector at the second user device, and the one or more third inner products were obtained respectively by calculating the inner products of the respective third parts of the first transformed vector and the respective third parts of the second transformed vector at each of the one or more third devices.

The adding module 605 is for summing at the first user device the first inner product, the second inner product and the one or more inner products, as the inner product of the first vector and the second vector.

According to an embodiment of the present invention, the apparatus of the present invention further may include an optional determining module 608 for determining whether the first user and the second user are neighbors according to the inner product of the first vector and the second vector.

While an apparatus for user information processing in a network environment in accordance with an embodiment of the present invention has been described above, it should be noted that the above description is only illustrative, rather than limitation to the present invention. In other embodiments of the present invention, the apparatus can have more, less or different modules and the connection, containment and function relationships among the modules may be different from that described and illustrated.

Figure 7:
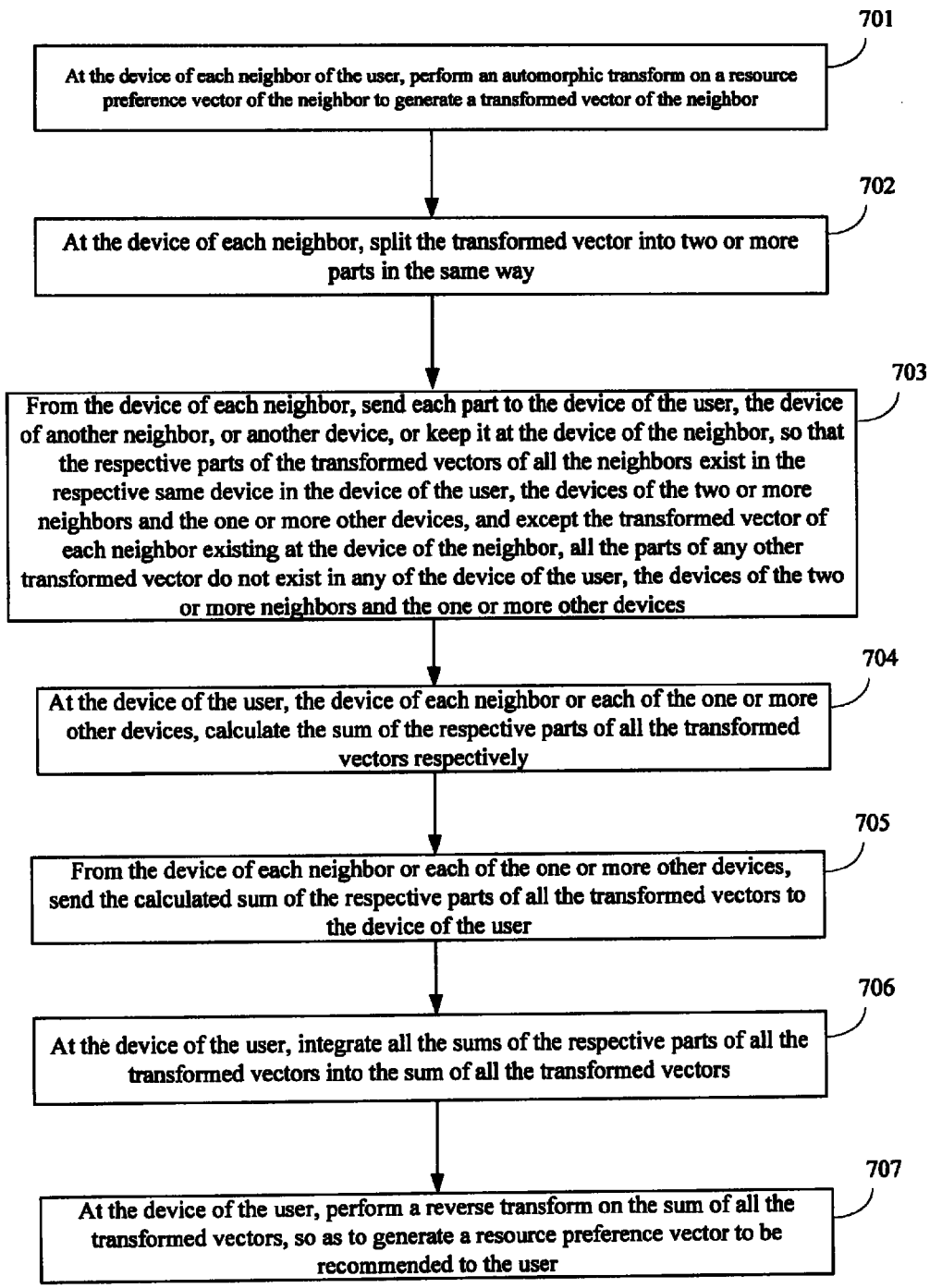
FIG. 7 illustrates a method for recommending resources in a network environment in accordance with an embodiment of the present invention.

In another aspect of the present invention, there is further provided a method for recommending resources to a user in a network environment. The method can recommend resources to a user based on the information of neighbors, partners or friends of the user without exposing their private information. Referring to FIG. 7, a method for recommending resources to a user in a network environment in accordance with an embodiment of the present invention will be described below.

As shown, in step 701, at the device of each of two or more neighbors of the user, an automorphic transform is performed on a resource preference vector of the neighbor to generate a transformed vector of the neighbor. A neighbor of the user refers to a user having similar resource preferences to the user. The method for user information processing in a network environment of the present invention as described above can be used to calculate the similarity between the user's resource preference vector and other users' resource preferences so as to find neighbors of the user. The resource preference vector may come from the user's various resource accesses and use information, such as the user's browsing history, download logs, transaction logs, personal profiles, etc. Each neighbor's resource preference vector should have the same size, namely, including the same number of elements. As known in the art, an automorphic transform satisfies the following formula:

$$a+b=T^{-1}(T(a)+T(b)),$$

wherein, a and b are two vectors of the same size, T is the automorphic transform, $T^{-1}$ is its reverse transform. Preferably, the transform should satisfy the requirement that no part of the transformed vector can be used to reconstruct the original vector. In an embodiment of the present invention, a dual discrete cosine transform is used, however, this is not a limitation to the present invention.

In step 702, at the device of each neighbor, the transformed vector is split into two or more parts in the same way, wherein the resource preference vector cannot be derived from any of the parts. That is, the transformed vector of each neighbor is split into the same number of parts of the same sizes, and the manner of splitting and/or the nature of the transform is such that the original resource preference vector cannot be derived from any part.

In step 703, from the device of each neighbor, each of the two or more parts is sent to the device of the user, the device of another neighbor, or one or more other devices, or is kept at the device of this neighbor. This is to ensure the respective parts of the transformed vectors of all the neighbors exist in the respective same device in the device of the user, the devices of the two or more neighbors and the one or more other devices. Except for the transformed vector of each neighbor existing at the device of the neighbor, all the parts of any other transformed vector do not exist in any of the device of the user, the devices of the two or more neighbors and the one or more other devices.

In step 704, at the device of the user, the device of each neighbor or each of the one or more other devices, the sum of the respective parts of all the transformed vectors is calculated respectively.

In step 705, from the device of each neighbor or each of the one or more other devices, the calculated sum of the respective parts of all the transformed vectors is sent to the device of the user.

In step 706, at the device of the user, all the sums of the respective parts of all the transformed vectors are integrated into the sum of all the transformed vectors.

In step 707, at the device of the user, the reverse transform is performed on the sum of all the transformed vectors, so as to generate a resource preference vector to be recommended to the user.

In accordance with an embodiment of the present invention, the method may further include an optional step 708, in which, at the device of the user, the elements in the generated resource preference vector are sorted according to the values of the elements in the resource preference vector for recommendation to the user. For example, a number of the first elements, i.e. resource items, in the sorted resource preference vector may be recommended to the user.

In accordance with an embodiment of the present invention, the method may further include an optional step 709, in which, before performing the automorphic transform on the resource preference vector of each neighbor at the device of the neighbor, the resource preference vector of the neighbor is multiplied by a similarity weight between the neighbor and the user. In this way, different neighbors of the user will influence the recommendation to the user in different extent according to their similarities with the user.

Figure 8:
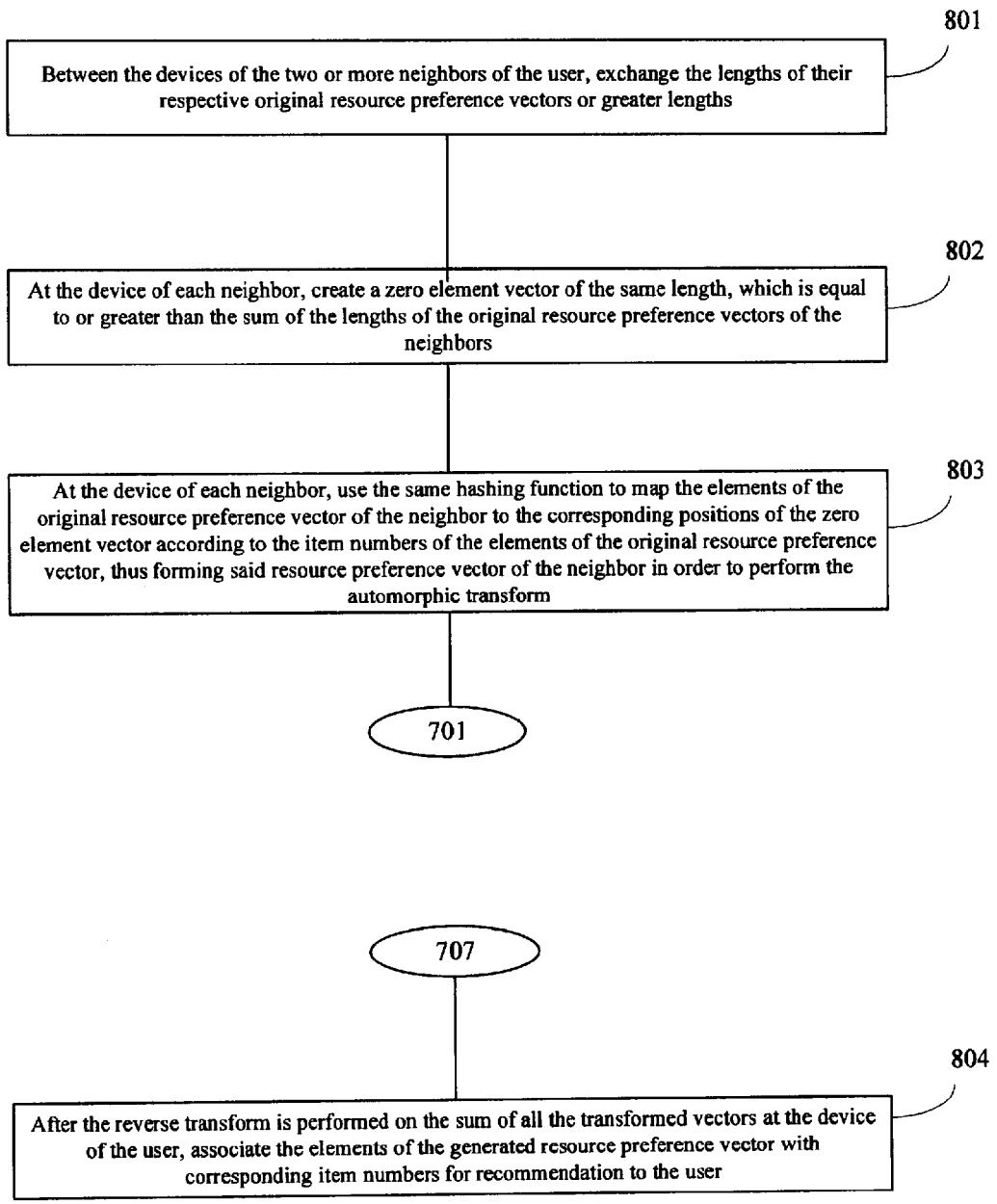
FIG. 8 illustrates the additional steps for compressing the lengths of resource preference vectors and associating the elements in the resource preference vector with the corresponding resource items in a method in accordance with an embodiment of the present invention.

In order to enhance the performance of the method of the present invention in cases involving large and sparse user preference vectors, in accordance with a further embodiment of the present invention, the method may further include additional steps of compressing the length of the resource preference vector before performing the transform on the resource preference vector on the device of each neighbor, and associating the elements of the resource preference vector generated at the device of the user with the corresponding resource items. FIG. 8 illustrates the additional steps of the method in accordance with the further embodiment of the present invention.

As shown, at step 801, between the devices of the two or more neighbors of the user, the lengths of their respective original resource preference vectors or greater lengths are exchanged.

In step 802, at the device of each neighbor, a zero element vector of the same length, which is equal to or greater than the sum of the lengths of the original resource preference vectors of the neighbors, is created.

In step 803, at the device of each neighbor, the same hashing function is used to map the elements of the original resource preference vector of the neighbor to the corresponding positions of the zero element vector according to the item numbers of the elements of the original resource preference vector, thus forming said resource preference vector of the neighbor in order to perform the automorphic transform. That is, after the step 803, the steps 701-707 as shown in FIG. 7 will be performed on the generated resource preference vector.

In step 804, the elements of the resource preference vector generated at the device of the user may be associated with corresponding item numbers for recommendation to the user. That is, the step 804 will be performed after the step 707 as shown in FIG. 7.

Figure 9:
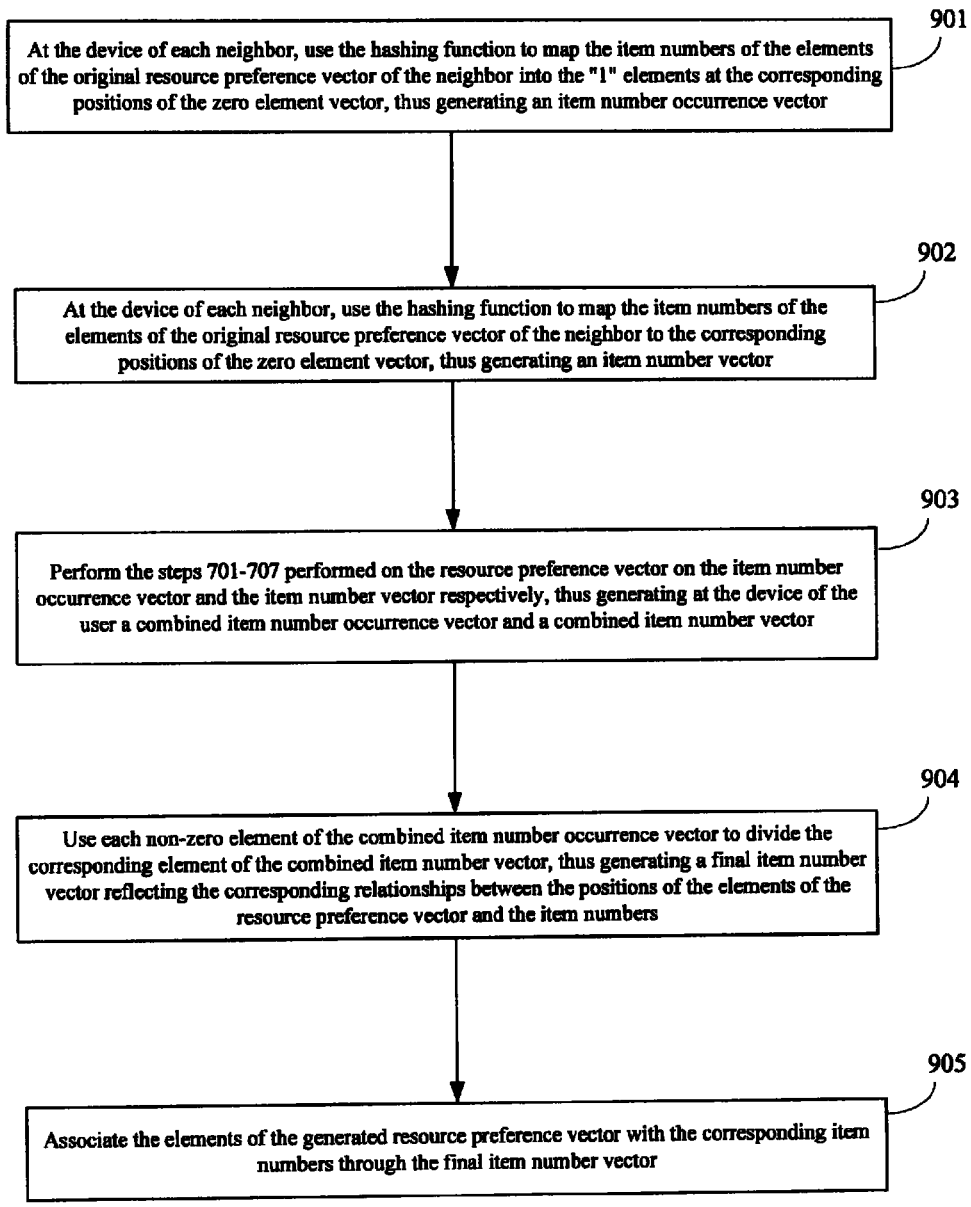
FIG. 9 illustrates the specific steps for implementing the associating step in a method in accordance with an embodiment of the present invention.

There are various methods for implementing the associating step 804. FIG. 9 illustrates specific steps for implementing the associating step in accordance with an embodiment of the present invention.

As shown, in an optional step 901, at the device of each neighbor, the hashing function is used to map the item numbers of the elements of the original resource preference vector of the neighbor into the "1" elements at the corresponding positions of the zero element vector, thus generating an item number occurrence vector. That is, the hashing function is performed on the item numbers of the elements of the original resource preference vector, the generated hashing values being considered the corresponding positions of the zero element vector, and the zero elements at the positions are set to "1". Of course, if the values of the elements of the original resource vector are "0" or "1", such as representing whether the user has browsed, downloaded or paid for an item, the item number occurrence vector is consistent with the resource preference vector, so there can be no the step 901, and the resource preference vector formed in step 903 may be used as the item number occurrence vector.

In step 902, at the device of each neighbor, the hashing function is used to map the item numbers of the elements of the original resource preference vector of the neighbor to the corresponding positions of the zero element vector, thus generating an item number vector. That is, the hashing function is performed on the item numbers of the elements of the original resource preference vector, the generated hashing values being taken as the corresponding positions of the zero element vector, and the item numbers are placed at the positions.

In step 903, the steps 701-707 performed on the resource preference vector as described above are performed on the item number occurrence vector and the item number vector respectively, thus generating at the device of the user a combined item number occurrence vector and a combined item number vector.

In step 904, each non-zero element of the combined item number occurrence vector is used to divide the corresponding element of the combined item number vector, thus generating a final item number vector reflecting the corresponding relationships between the positions of the elements of the resource preference vector and the item numbers.

In step 905, the elements of the generated resource preference vector are associated with the corresponding item numbers through the final item number vector. That is, since the value of each element of the final item number vector is an item number, and the position of the element is consistent with the position of the corresponding element of the resource preference vector generated in step 707, the final item number vector can be used to get the item number to which each element of the resource preference vector generated in step 707 corresponds.

Through the above steps, the association between the elements of the resource preference vector and corresponding item numbers is realized, without exposing private information of the neighbors.

Figure 10:
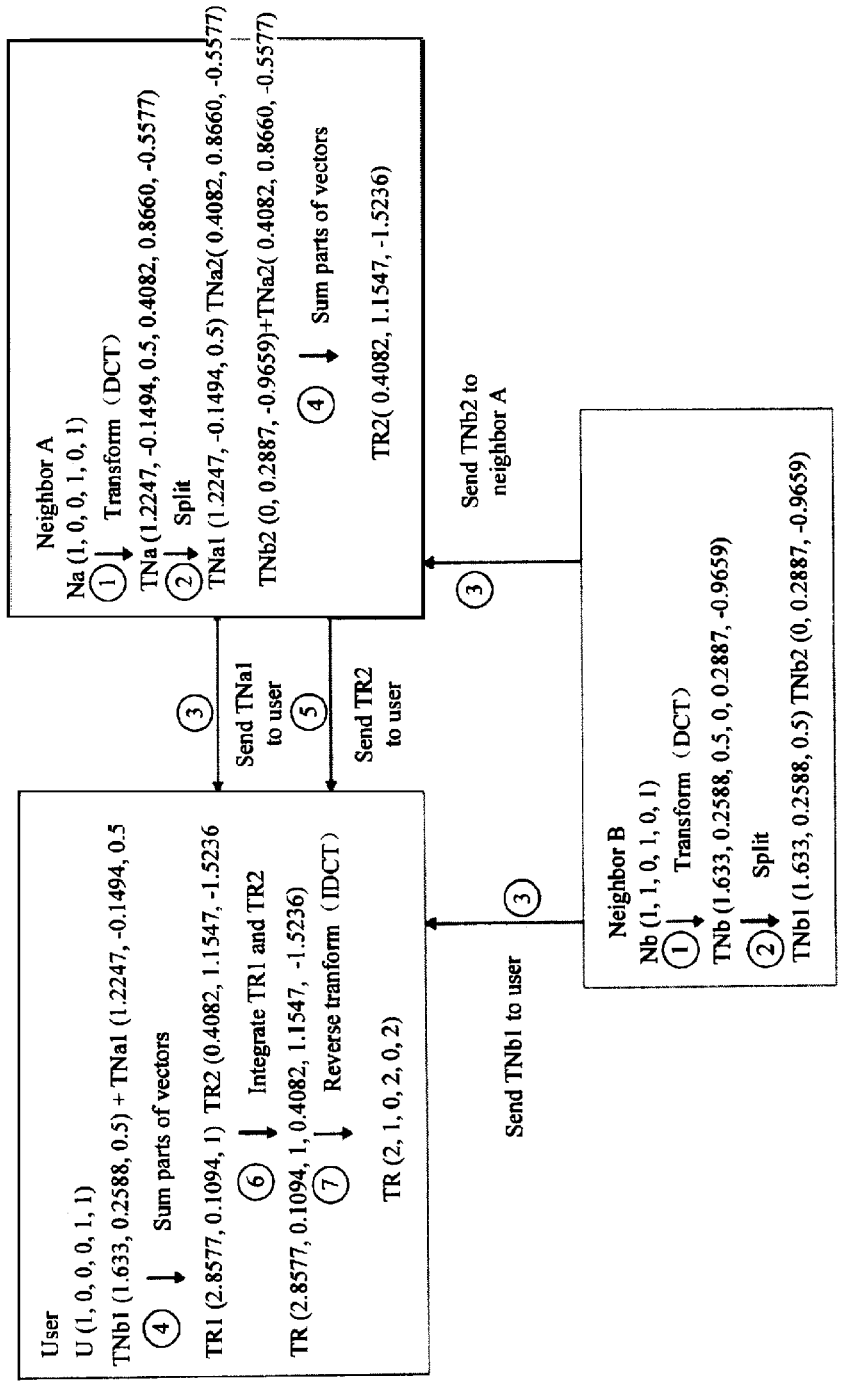
FIG. 10 schematically exemplifies the process of the method for recommending resources to a user in a network environment in accordance with an embodiment of the present invention.

FIG. 10 schematically exemplifies the process of the method for recommending resources to a user in a network environment in accordance with an embodiment of the present invention. As shown, the user has two neighbors, A and B. The resource preference vector of neighbor A is Na(1, 0, 0, 1, 0, 1), the resource preference vector of neighbor B is Nb(1, 1, 0, 1, 0, 1), wherein an element value "1" in each resource preference vector may represent that the user has browsed, downloaded or paid for an item, and "0" may represent not; however, the values of the elements of the resource preference vectors may also be numbers other that "0" and "1".

In the first step, the neighbors A and B perform the same discrete cosine transform on their resource preference vectors Na(1, 0, 0, 1, 0, 1) and Nb(1, 1, 0, 1, 0, 1) respectively, thus getting transformed vectors TNa(1.2247, −0.1494, 0.5, 0.4082, 0.8660, −0.5577) and TNb(1.633, 0.2588, 0.5, 0, 0.2887, −0.9659).

In the second step, neighbors A and B split the transformed vector TNa and TNb respectively in the same way, thus getting TNa1(1.2247, −0.1494, 0.5), TNa2(0.4082, 0.8660, −0.5577) and TNb1(1.633, 0.2588, 0.5), TNb2(0, 0.2887, −0.9659) respectively.

In the third step, neighbor A sends TNa1 to the user, while neighbor B sends TNb1 to the user, and sends TNb2 to neighbor A.

In the fourth step, the user sums TNa1 and TNb1 to get TR1(2.8577, 0.1094, 1), while neighbor A sums TNa2 and TNb2 to get TR2(0.4082, 1.1547, −1.5236).

In the fifth step, neighbor A sends TR2 to the user.

In the sixth step, the user combines TR1 and TR2 to get TR(2.8577, 0.1094, 1, 0.4082, 1.1547, −1.5236).

In the seventh step, the reverse discrete cosine transform is performed on TR to get the resource preference vector R(2, 1, 0, 2, 0, 2) to be recommended to the user. The vector R(2, 1, 0, 2, 0, 2) is just the sum of the resource preference vectors Na(1, 0, 0, 1, 0, 1) and Nb(1, 1, 0, 1, 0, 1) of neighbors A and B. After the vector R has been obtained at the device of the user, the user's own resource preference vector U(1, 0, 0, 0, 1, 1) can further be used to filter out from R the items that the user has browsed, downloaded or paid for, and the remaining elements of R can be sorted, thus generating a recommending list to be provided to the user, such as a recommending list including some first elements of R.

Using the above process, neither the user, nor neighbors A and B can get another user's preference vector. The user and neighbor A both get parts of the transformed vector of neighbor B, but they cannot reconstruct the resource preference vector of B or part thereof from the parts of the transformed vector. The end user gets the sum of the transformed vectors of neighbors A and B, and performs the reverse transform on it to get the vector R, which is exactly the sum of the resource preference vectors of A and B. In fact, the above process uses the formula: $a+b=T^{-1}(T(a)+T(b))$.

As can be understood by those skilled in the art, the above process is only illustrative, in stead of limitation to the present invention. The process of the method of the present invention can have many variants. If fact, the purpose of the present invention can be realized by providing only that at each device there is no complete transformed vector from other devices apart from the original resource preference vector and the transformed vector in the device; thus, any device cannot reconstruct the resource preference vector in another device, and that corresponding parts of the resource transformed vectors of all the neighbors exist in a device so that the device can sum the corresponding parts of the resource transformed vectors of all the neighbors and then send the obtained sum to the device of the user, which can then integrate the sums of the parts into the sum of all the transformed vectors and perform the reverse transform.

For example, in the above third step, it may not be the case that neighbors A and A send TNa1 and TNb1 to the device of the user respectively. Also, at the fourth step, where TNa1 and TNb1 are summed at the device of the user, rather, neighbor A may send TNa1 to neighbor B, which may sum up TNa1 and TNb1 to get TR1 at the fourth step, and send TR1 to the device of the user at the fifth step while neighbor A sends TR2 to the device of the user. Or, at the third step, neighbors A and B may send TNa1 and TNb1 respectively to another device apart from the device of the user, neighbors A and B, at which other device the summing may be performed and the obtained sum may be sent to the device of the user. Of course, there may also be two other devices, so that neighbors A and B may send TNa1 and TNb1 respectively to a first other device, and send TNa2 and TNb2 respectively to the second other device, and the first and second other devices may sum TNa1 and TNb1, and TNa2 and TNb2 respectively, and send the obtained sums respectively to the device of the user. Further, the transformed vectors TNa and TNb of neighbors A and B may also be split into three or more parts in the same way, which parts may be sent to different devices in the device of the user, neighbor A, neighbor B and other devices to be summed, and the obtained sums may be sent to the device of the user to be integrated into the sum of the transformed vectors TNa and TNb. Moreover, the method of the present invention may be applied to the case of more than two neighbors, in which case, only as an example, each neighbor may split its transformed vector into two parts, send the first part to the device of the user, and send the second part to neighbor A, etc. All these variations are within the scope and spirit of the present invention.

Figure 11A:
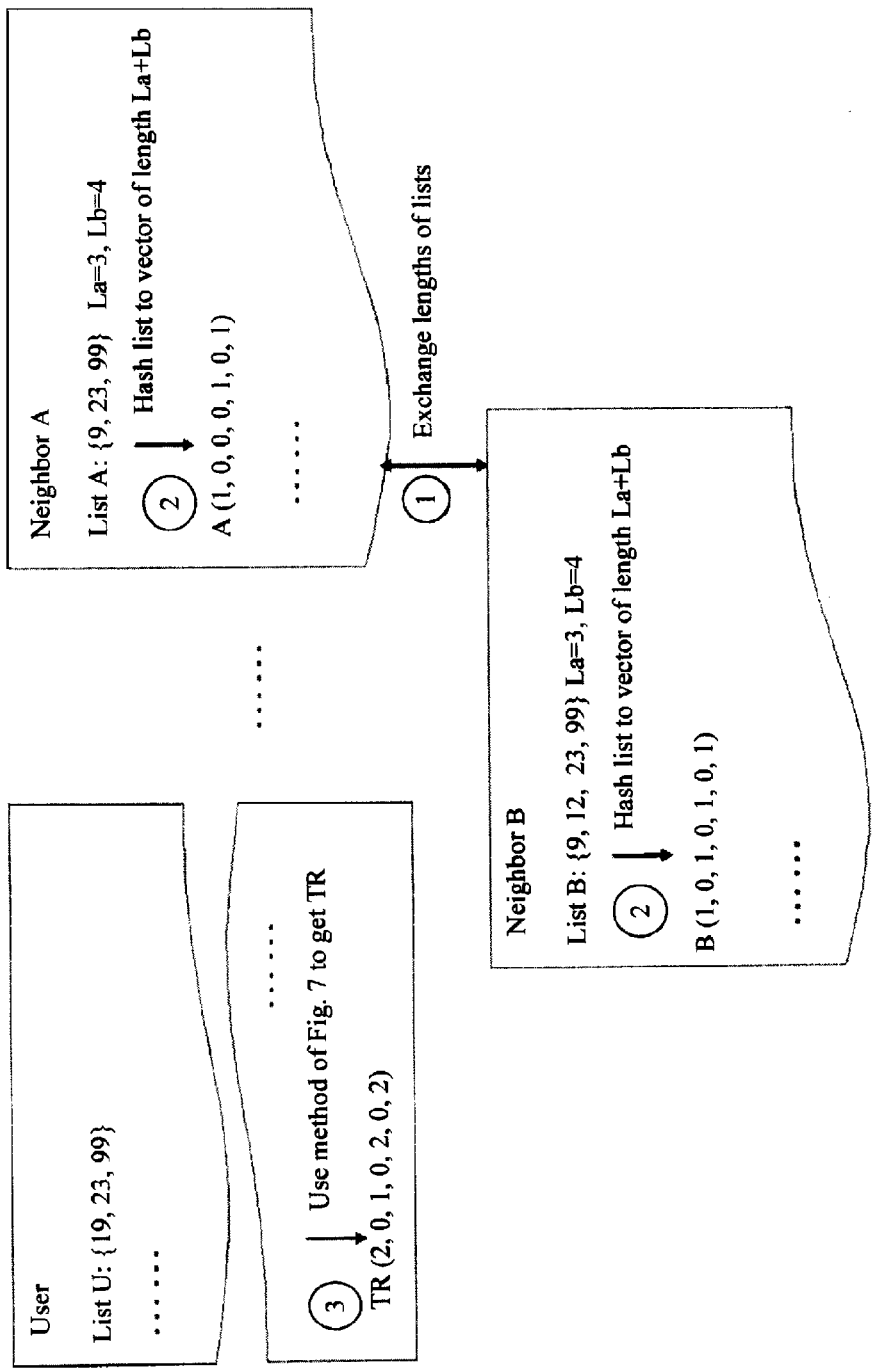
FIGS. 11A and 11B schematically illustrates the implementation process of the additional steps for associating the elements in a resource preference vector with the corresponding items in accordance with an embodiment of the present invention.
Figure 11B:
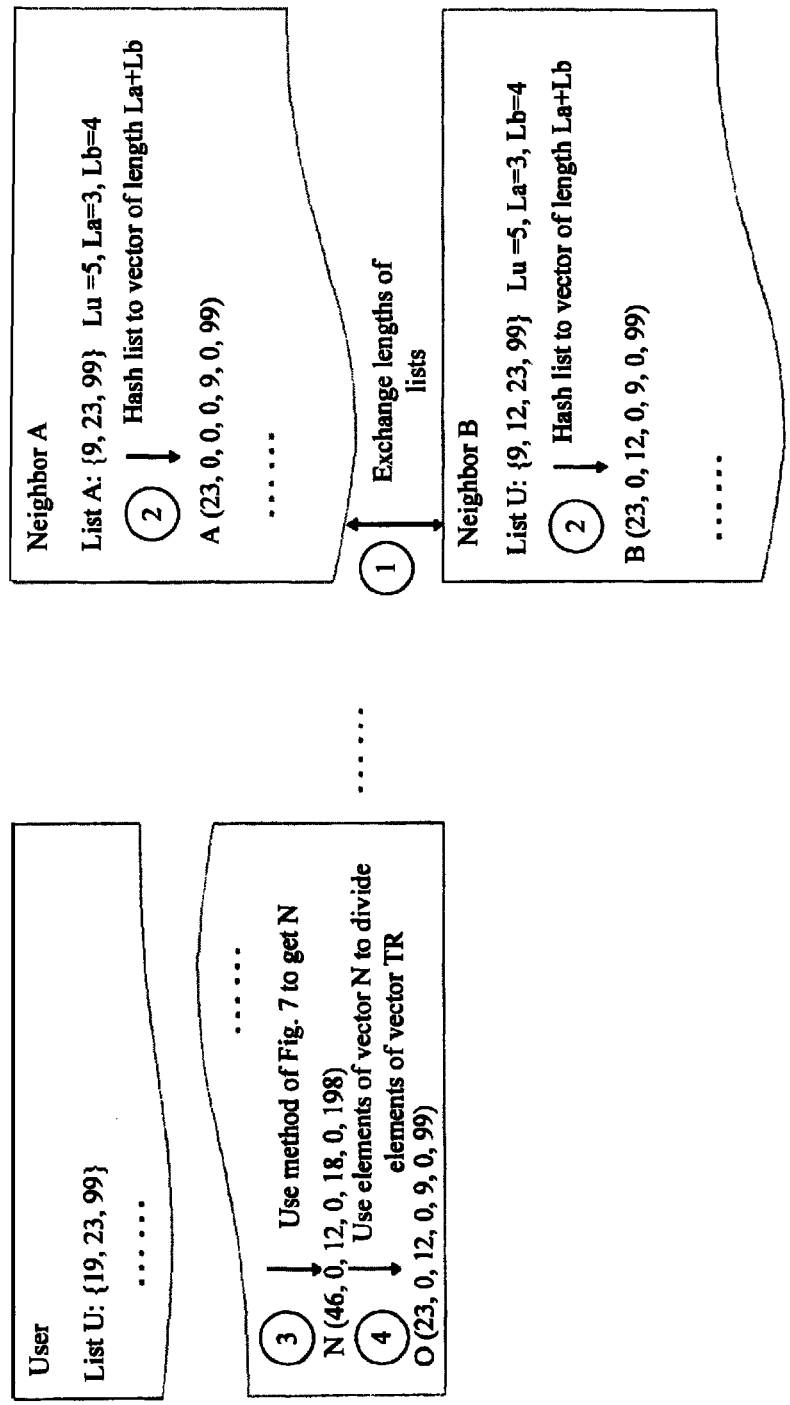

FIGS. 11A and 11B schematically illustrate the additional step of associating the elements of the resource preference vector generated at the device of the user with the corresponding items in the method comprising the lengths of resource preference vectors in accordance with an embodiment of the present invention.

As shown in FIG. 11A, the item number list of the elements of the resource preference vector of neighbor A is {9, 23, 99}, and the length of its resource preference vector is La=3. The item number list of the elements of the resource preference vector of neighbor B is {9, 12, 23, 99}, and the length of its resource preference vector is Lb=4. The values of the elements of the resource preference vectors of neighbors A and B are not shown, and may be "0" or "1", or may be other values.

Neighbors A and B have obtained the length of the zero element vectors, La+Lb=7, by exchanging the lengths of the resource preference vectors, and generated the zero element vectors respectively. Neighbor A may use a hashing function to map the numbers in the item number list into the corresponding positions in the zero element vector, and set the values at the positions to 1. That is, neighbor A may perform the hashing function on 9 to obtain the value of 4, therefore setting the fourth element of the zero element vector to 1; perform the hashing function on 23 to obtain the value of 0, therefore setting the zeroth element of the zero element vector to 1; perform the hashing function on 99 to obtain the value of 6, therefore setting the sixth element of the zero element vector to 1; while other elements remain to be zero. Thus, an item number occurrence vector A (1, 0, 0, 0, 1, 0, 1) is obtained. In the same way, neighbor B may generate an item number occurrence vector B(1, 0, 1, 0, 1, 0, 1) according to its item number list. Then, for the item number occurrence vectors A(1, 0, 0, 0, 1, 0, 1) and B (1, 0, 1, 0, 1, 0, 1), neighbors A and B and the device of the user may generate a combined item number occurrence vector TR(2, 0, 1, 0, 2, 0, 2) at the device of the user through the method as described above, illustrated in FIG. 7 and exemplified in FIG. 10.

It should be pointed out that in case that the values of the elements of the resource preference vectors of neighbors A and B are only represented by 0 or 1, the resource preference vectors of neighbors A and B are consistent with their item number occurrence vectors, and the generated resource preference vector of the user is also consistent with the combined item number occurrence vector. Thus, the process for generating the resource preference vector of the user is the same process for generating the combined item number occurrence vector at the device of the user. In case that the values of the elements of the resource preference vectors of neighbors A and B are not represented only by 0 or 1, the resource preference vectors of neighbors A and B are not consistent with their item number occurrence vectors. Thus, there must be a separate process for generating the combined item number occurrence vector at the device of the user apart from the process for generating the resource preference vector of the user.

Further referring to FIG. 11B, after neighbors A and B have created zero element vectors with the length of 7 by exchanging their resource preference vectors, neighbor A uses the hashing function to map the elements of its item number list to the corresponding positions of the zero element vector. That is, neighbor A performs the hashing function on 9 to get the value of 4, therefore placing the item number 9 at the fourth element position of the zero element vector; performs the hashing function on 23 to get the value of 0, therefore placing the item number 23 at the zeroth element position of the zero element vector; performs the hashing function on 99 to get the value of 6, therefore placing the item number 99 at the sixth element position of the zero element vector; while other elements remain to be zero, thus getting the item number vector A(23, 0, 0, 0, 9, 0, 99). In the same way, neighbor B generates an item number vector B(23, 0, 12, 0, 9, 0, 99) according to its item number list. Then, for the item number vectors A(23, 0, 0, 0, 9, 0, 99) and B(23, 0, 12, 0, 9, 0, 99), neighbors A and B and the device of the user generate a combined item number vector N(46, 0, 12, 0, 18, 0, 198) at the device of the user using the method as described above, shown in FIG. 7 and exemplified in FIG. 10.

Then, the elements of the combined item number occurrence vector TR(2, 0, 1, 0, 2, 0, 2) is used to divide the corresponding elements of the combined item number vector N(46, 0, 12, 0, 18, 0, 198), getting the final item number vector O(23, 0, 12, 0, 9, 0, 99). The values of the elements of the final item number vector are item numbers, while the positions of the elements are consistent with the positions of the corresponding items of the resource preference vector generated at the device of the user. Thus, the final item number vector can be used to get the resource items to which the elements of the resource preference vector generated at the device of the user correspond to. For example, assuming the resource preference vector generated at the device of the user is TR(2, 0, 1, 0, 2, 0, 2), from the final item number vector O(23, 0, 12, 0, 9, 0, 99), it can be known that the zeroth element of the resource preference vector corresponds to the resource item number 23, the second element corresponds to the resource item number 12, the fourth element corresponds to the resource item number 9, the sixth element corresponds to the resource item number 99. Thus, meaningful resource recommendation list can be provided to the user.

While the above has described a method for recommending resources to a user in a network environment in accordance with an embodiment of the present invention, it should be noted that the above description is only illustrative and not a limitation to the present invention. In other embodiments of the present invention, the method may have more, less or different steps, and the order among the steps may be different from that described, or they may be executed in parallel.

Figure 12:
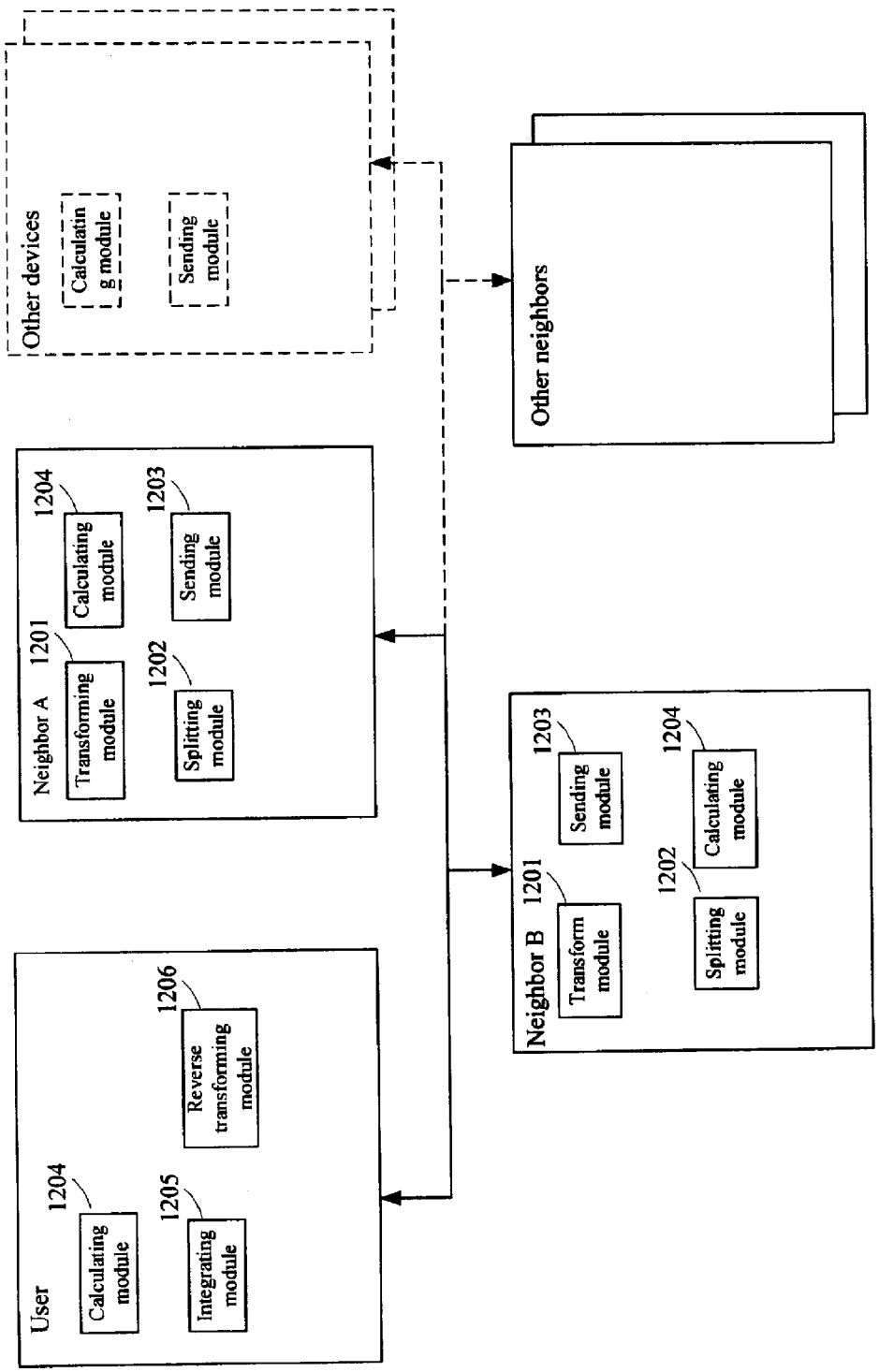
FIG. 12 illustrates a system for recommending resources to a user in a network environment in accordance with an embodiment of the present invention.

FIG. 12 illustrates a system for recommending resources to a user in a network environment in accordance with an embodiment of the present invention. The system includes the modules as shown in FIG. 12.

A transforming module 1201 resides at the device of each of two or more neighbors, for performing an automorphic transform on a resource preference vector of the neighbor to generate a transformed vector of the neighbor.

A splitting module 1202 resides at the device of the each neighbors, for splitting the respective transformed vector into two or more parts in the same way, wherein the resource preference vector or part thereof cannot be derived from any of the parts.

A sending module 1203 resides at the device of the each neighbor, for sending each of the two or more parts to the device of the user, the device of another neighbor, or one or more other devices, or making it to remain at the device of this neighbor, so that the respective parts of the transformed vector of all the neighbors exist in the respective same device in the device of the user, the devices of the two or more neighbors and the one or more other devices. Except for the transformed vector of each neighbor existing at the device of the neighbor, all the parts of any other transformed vector do not exist in any of the device of the user, the devices of the two or more neighbors and the one or more other devices.

A calculating module 1204 resides at the device of the user, the device of each neighbor or each of the one or more other devices, for calculating the sum of the respective parts of all the transformed vectors respectively.

A sending module 1203 resides at the device of each neighbor or each of the one or more other devices, for sending the calculated sum of the respective parts of all the transformed vector to the device of the user.

An integrating module 1205 resides at the device of the user, for integrating all the sums of the respective parts of all the transformed vectors into the sum of all the transformed vectors.

A reverse transforming module 1206 resides at the device of the user, for performing the reverse transform on the sum of all the transformed vectors, so as to generate a resource preference vector to be recommended to the user.

In an embodiment of the present invention, the system may further include a sorting module (not shown) at the device of the user, for sorting the elements in the generated resource preference vector according to the values of the elements in the resource preference vector for recommendation to the user.

In an embodiment of the present invention, the system may further include a weighting module (not shown) at the device of each neighbor, for, before the automorphic transform is performed on the resource preference vector of the neighbor, multiplying the resource preference vector of the neighbor by a similarity weight between the neighbor and the user.

In an embodiment of the present invention, the transform is dual discrete cosine transform.

In an embodiment of the present invention, the system may further include other modules not shown in the drawings.

A length exchange module may reside at the device of each neighbor, for exchanging the lengths of the respective original resource preference vectors or greater lengths between the devices of the two or more neighbors of the user.

A zero element vector creating module may reside at the device of each neighbor, for creating a zero element vector of the same length, which is equal to or greater than the sum of the lengths of the original resource preference vectors of the neighbors.

A hashing module may reside at the device of each neighbor, for using the same hashing function to map the elements of the original resource preference vector of the neighbor to the corresponding positions of the zero element vector according to the item numbers of the elements of the original resource preference vector, thus forming said resource preference vector of the neighbor in order to perform the automorphic transform.

An association module may reside at the device of the user, for associating the elements of the generated resource preference vector with corresponding item numbers in order to be recommended to the user after the reverse transform is performed on the sum of all the transformed vectors.

In an embodiment of the present invention, the system may further include other technical features.

The hashing module at the device of each neighbor may further use the hashing function to map the item numbers of the elements of the original resource preference vector of the neighbor into the "1" elements at the corresponding positions of the zero element vector, thus generating an item number occurrence vector.

The hashing module at the device of each neighbor may further use the hashing function to map the item numbers of the elements of the original resource preference vector of the neighbor to the corresponding positions of the zero element vector, thus generating an item number vector.

The transforming module 1201, splitting module 1202, sending module 1203 at the device of each neighbor, the calculating module 1204 at the device of the user, the device of each neighbor or each of the one or more other devices, the sending module 1203 at the device of each neighbor or each of the one or more other devices, the integrating module 1205, the reverse transforming module 1206 at the device of the user, may further perform respective operations on the item number occurrence vector and the item number vector respectively, thus generating at the device of the user a combined item number occurrence vector and a combined item number vector.

Also, the system may further include a division module at the device of the user, for using each non-zero element of the combined item number occurrence vector to divide the corresponding element of the combined item number vector, thus generating a final item number vector reflecting the corresponding relationships between the positions of the elements of the resource preference vector and the item numbers, and wherein the linking module is for associating the elements of the generated resource preference vector with the corresponding item numbers through the final item number vector.

While the above has described a system for recommending resources to a user in a network environment in accordance with an embodiment of the present invention, it is to be noted that the above description and the drawings are only illustration and not a limitation to the present invention. The system of the present invention may have more, less or different modules and the relationships among the modules may be different from that described. In addition, in different embodiments of the present invention, the system may involve two or more neighbor devices, may or may not involve other devices, and one or more modules of the system may reside at different devices in the device of the user, neighbor devices and other devices. All these variations are within the spirit and scope of the present invention.

The present invention can be realized in hardware, software, or a combination of hardware and software. The present invention can be realized in a centralized fashion in one computer system or in a distributed fashion where different elements are spread across several interconnected computer systems. Any kind of computer system or other apparatus adapted for carrying out the methods described herein is suited.

The present invention also can be embedded in a computer program product, which includes all the features enabling the implementation of the methods described herein, and which when loaded in a computer system is able to carry out these methods.

While the invention has been particularly shown and described with reference to a preferred embodiment, it will be understood by those skilled in the art that various changes in form and detail may be made therein without departing from the spirit and scope of the invention.

What is claimed is:

1. A method for user information processing in a network environment, the method comprising the steps of:
   performing an orthogonal transform on a first vector representing information related to a first user at a first user device, thus obtaining a first transformed vector;
   splitting the first transformed vector into a plurality of parts at the first user device, wherein the first vector or part thereof cannot be derived from any part of the first transformed vector and wherein each part has a part order number;
   sending a part of the first transformed vector from the first user device to a second user device, retaining another part of the first transformed vector and, if the first transformed vector was split into more than two parts, sending any additional parts to one or more additional user devices, wherein all the devices are connected with the first user device via a network, and wherein the parts are sent such that each part is sent to a different user device;
   receiving, at the first user device, a part of a second transformed vector from the second user device, wherein (i) the part of the second transformed vector was obtained by performing the orthogonal transform on a second vector representing the information related to the second user to obtain a second transformed vector, (ii) the second transformed vector was split correspondingly into an equal number of parts at the second user device as in the first user device, (iii) the second vector or part thereof cannot be derived from any part of the second transformed vector, and (iv) the part of the second transformed vector received by the first user device has a same part order number as the part retained by the first user device;
   calculating, at the first user device, an inner product of the part of the first transformed vector retained by the first user device and the part of the second transformed vector received by the first user device to obtain a first inner product;
   receiving, at the first user device, a second inner product from the second user device, wherein the second inner product was obtained by calculating an inner product of the part of the first transformed vector sent to the second user device and the part of the second transformed vector at the second user device having the same part order number;
   receiving, at the first user device, any additional inner products from any additional user devices that were sent a part of the first transformed vector from the first user device, wherein the inner product was calculated at the additional user device by calculating an inner product of the part of the first transformed vector sent to the additional user device and the part of the second transformed vector sent by the second user device to the additional user device having the same part order number; and
   summing, at the first user device, the first inner product, the second inner product, and any additional inner products as an inner product of the first vector and second vector at the first user device.

2. The method of claim 1, further comprising the steps of:
   sending a first original vector length that is equal to either (i) a length of a first original vector representing information related to the first user or (ii) a greater length, from the first user device to the second user device;
   receiving a second original vector length that is equal to either (i) a length of a second original vector representing information related to the second user or (ii) a greater length, from the second user device;
   creating, at the first user device, a first zero element vector having a length equal to or greater than the sum of the first original vector length and the second original vector length; and
   using a hashing function at the first user device to map elements of the first original vector to corresponding positions of the first zero element vector according to item numbers of the elements of the first original vector, thus forming the first vector,
   wherein the second vector was formed by creating a second zero element of a same length as the first zero element vector and using the hashing function to map the elements of the second original vector to the corresponding positions of the second zero element vector according to the item numbers of the elements of the second original vector at the second user device.

3. The method of claim 1, wherein the orthogonal transform is a dual discrete cosine transform.

4. The method of claim 1, wherein the orthogonal transform is implemented with a random orthogonal matrix.

5. The method of claim 1, further comprising a step of determining whether the first user and the second user are neighbors according to the inner product of the first vector and the second vector.

6. A non-transitory article of manufacture tangibly embodying computer readable instructions which, when implemented, cause a computer to carry out the steps of a method for user information processing in a network environment, the method comprising the steps of:
   performing an orthogonal transform on a first vector representing information related to a first user at a first user device, thus obtaining a first transformed vector;
   splitting the first transformed vector into a plurality of parts at the first user device, wherein the first vector or part thereof cannot be derived from any part of the first transformed vector and wherein each part has a part order number;

sending a part of the first transformed vector from the first user device to a second user device, retaining another part of the first transformed vector and, if the first transformed vector was split into more than two parts, sending any additional parts to one or more additional user devices, wherein all the devices are connected with the first user device via a network, and wherein the parts are sent such that each part is sent to a different user device;

receiving, at the first user device, a part of a second transformed vector from the second user device, wherein (i) the part of the second transformed vector was obtained by performing the orthogonal transform on a second vector representing the information related to the second user to obtain a second transformed vector, (ii) the second transformed vector was split correspondingly into an equal number of parts at the second user device as in the first user device, (iii) the second vector or part thereof cannot be derived from any part of the second transformed vector, and (iv) the part of the second transformed vector received by the first user device has a same part order number as the part retained by the first user device;

calculating, at the first user device, an inner product of the part of the first transformed vector retained by the first user device and the part of the second transformed vector received by the first user device to obtain a first inner product;

receiving, at the first user device, a second inner product from the second user device, wherein the second inner product was obtained by calculating an inner product of the part of the first transformed vector sent to the second user device and the part of the second transformed vector at the second user device having the same part order number;

receiving, at the first user device, any additional inner products from any additional user devices that were sent a part of the first transformed vector from the first user device, wherein the inner product was calculated at the additional user device by calculating an inner product of the part of the first transformed vector sent to the additional user device and the part of the second transformed vector sent by the second user device to the additional user device having the same part order number; and summing, at the first user device, the first inner product, the second inner product, and any additional inner products as an inner product of the first vector and second vector at the first user device.

7. The article of manufacture of claim 6, wherein the sending and receiving steps further comprise sending the length of a first original vector representing information related to the first user or a greater length from the first user device to the second user device, and receiving the length of a second original vector representing information related to the second user or a greater length from the second user device.

8. The article of manufacture of claim 7, further comprising the steps of:
creating a first zero element vector of the length equal to or greater than the sum of the lengths of the first original vector and the second original vector at the first user device; and
using a hashing function at the first user device to map the elements of the first original vector to the corresponding positions of the first zero element vector according to the item numbers of the elements of the first original vector, thus forming the first vector,
wherein the second vector was formed by creating a second zero element of the same length as the first zero element vector and using the hashing function to map the elements of the second original vector to the corresponding positions of the second zero element vector according to the item numbers of the elements of the second original vector at the second user device.

9. The article of manufacture of claim 6, wherein the transformation step uses a dual discrete cosine transform to carry out the orthogonal transform.

10. The article of manufacture of claim 6, wherein the transformation step uses a random orthogonal matrix to carry out the orthogonal transform.

11. The article of manufacture according to claim 6, further comprising the step of determining whether the first user and the second user are neighbors according to the inner product of the first vector and the second vector.

* * * * *